US011879621B2

(12) United States Patent
Van Bommel et al.

(10) Patent No.: US 11,879,621 B2
(45) Date of Patent: Jan. 23, 2024

(54) LIGHTING DEVICE WITH LIGHT-EMITTING FILAMENTS

(71) Applicant: SIGNIFY HOLDING B.V., Eindhoven (NL)

(72) Inventors: Ties Van Bommel, Norst (NL); Rifat Ata Mustafa Hikmet, Eindhoven (NL); Robert Jacob Pet, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/205,521

(22) Filed: Jun. 3, 2023

(65) Prior Publication Data

US 2023/0304652 A1 Sep. 28, 2023

Related U.S. Application Data

(62) Division of application No. 17/619,351, filed as application No. PCT/EP2020/065795 on Jun. 8, 2020, now Pat. No. 11,692,696.

(30) Foreign Application Priority Data

Jun. 18, 2019 (EP) .................................... 19180908

(51) Int. Cl.
*F21V 23/00* (2015.01)
*F21V 19/00* (2006.01)
(Continued)

(52) U.S. Cl.
CPC ........ *F21V 23/006* (2013.01); *F21V 19/0035* (2013.01); *F21V 23/06* (2013.01); *F21Y 2103/10* (2016.08); *F21Y 2115/10* (2016.08)

(58) Field of Classification Search
CPC .... F21V 23/006; F21V 19/0035; F21V 23/06; F21Y 2103/10; F21Y 2115/10
See application file for complete search history.

(56) References Cited

U.S. PATENT DOCUMENTS

| | | | |
|---|---|---|---|
| 11,047,532 | B1 | 6/2021 | Chen et al. |
| 2009/0212698 | A1 | 8/2009 | Bailey |

(Continued)

FOREIGN PATENT DOCUMENTS

| | | | |
|---|---|---|---|
| CN | 104075169 | A | 10/2014 |
| CN | 104110632 | A | 10/2014 |

(Continued)

*Primary Examiner* — Evan P Dzierzynski

(57) ABSTRACT

There is presented a lighting device comprising: several light-emitting filaments (15, 15') with solid-state light sources and a circuit board (10) with first and second electrically conductive tracks (13, 14) following first and second paths, respectively. Each light-emitting filament (15, 15') comprises a first electrical contact (19, 19') electrically connected to the first track (13) at a first point on the first path, and a second electrical contact (20, 20') electrically connected to the second track (14) at a second point on the second path. The first and second points associated with each light-emitting filament (15, 15') are arranged on an axis (A) which is non-perpendicular to a tangent ($T_1$) to the first path at the first point and to a tangent ($T_2$) to the second path at the second point. The lighting device may be adapted to emit light from what appears to be a surface according to an observer.

15 Claims, 7 Drawing Sheets

(51) Int. Cl.

| | |
|---|---|
| ***F21V 23/06*** | (2006.01) |
| *F21Y 103/10* | (2016.01) |
| *F21Y 115/10* | (2016.01) |

(56) References Cited

U.S. PATENT DOCUMENTS

| | | | | |
|---|---|---|---|---|
| 2013/0058080 | A1* | 3/2013 | Ge | H05B 45/357<br>362/249.02 |
| 2014/0265809 | A1* | 9/2014 | Hussell | H05K 1/142<br>313/3 |
| 2015/0082955 | A1 | 3/2015 | Zhou et al. | |
| 2018/0031185 | A1 | 2/2018 | Pettmann | |
| 2018/0066811 | A1 | 3/2018 | Knapp et al. | |
| 2018/0097154 | A1 | 4/2018 | Marfeld et al. | |
| 2018/0106435 | A1* | 4/2018 | Wu | F21V 19/005 |
| 2018/0172218 | A1 | 6/2018 | Feit | |
| 2019/0264875 | A1* | 8/2019 | Jiang | H05B 45/20 |
| 2019/0301683 | A1* | 10/2019 | Jiang | H05B 45/00 |

FOREIGN PATENT DOCUMENTS

| | | | |
|---|---|---|---|
| CN | 104406068 | B | 6/2016 |
| CN | 105627125 | A | 6/2016 |
| CN | 205824949 | U | 12/2016 |
| CN | 206379378 | U | 8/2017 |
| CN | 107191788 | A | 9/2017 |
| EP | 2742540 | A1 | 6/2014 |
| EP | 3208514 | A1 | 8/2017 |

* cited by examiner

LIGHTING DEVICE WITH LIGHT-EMITTING FILAMENTS

CROSS-REFERENCE TO PRIOR APPLICATIONS

This application is a Divisional Application of U.S. Pat. No. 17,619,351, filed on Dec. 15, 2021, and a U.S. National Phase application under 35 U.S.C. § 371 of International Application No. PCT/EP2020/065795, filed on Jun. 8, 2020, which claims the benefit of European Patent Application No. 19180908.6, filed on Jun. 18, 2019. These applications are hereby incorporated by reference herein.

FIELD OF THE INVENTION

The present invention relates to a lighting device with light-emitting filaments based on solid-state lighting technology.

BACKGROUND OF THE INVENTION

Light-emitting filaments based on solid-state lighting technology have traditionally been used in light bulbs designed to resemble traditional incandescent light bulbs. An example of such a light bulb is disclosed in CN104075169A, which includes a pear-shaped bulb inside which several parallel light-emitting diode (LED) filaments extend between two circular wires which are connected to the ends of the LED filaments.

There is currently much interest in using light-emitting filaments based on solid-state lighting technology in other lighting applications than light bulbs such as the one disclosed in CN104075169A. Some of the challenges encountered when developing new applications include difficulties in achieving a sufficient level of luminous power as well as manufacturing difficulties due to, for example, the light-emitting filaments being relatively fragile.

SUMMARY OF THE INVENTION

An object of the present invention is to provide an improved or alternative lighting device with light-emitting filaments based on solid-state lighting technology.

According to a first aspect of the present invention, there is provided a lighting device comprising: a plurality of light-emitting filaments, wherein each light-emitting filament comprises a carrier, two electrical contacts attached to the carrier, a plurality of solid-state light sources mounted on the carrier and electrically connected to the first and second electrical contacts, and an encapsulant comprising a translucent material, wherein the encapsulant at least partially encloses the solid-state light sources so as to receive light emitted by the solid-state light sources; and an circuit board comprising a first track, which is electrically conductive and follows a first path, and a second track which is electrically conductive and follows a second path, wherein the light-emitting filaments are arranged consecutively along the first and second tracks and extend therebetween, wherein one of the electrical contacts of each light-emitting filament is electrically connected to the first track at a first point on the first path and the other electrical contact of each light-emitting filament is electrically connected to the second track at a second point on the second path, wherein the first and second points associated with each light-emitting filament are arranged at a distance from each other on an axis, and wherein the axis of each light-emitting filament is non-perpendicular to a tangent to the first path at the first point and to a tangent to the second path at the second point.

The encapsulant of each light-emitting filament may comprise at least one of a wavelength-converting material and a light-scattering material. The wavelength-converting material is configured to convert light emitted by the solid state-light sources into converted light. The axis is a straight geometrical axis. If the light-emitting filament is straight, the axis may be parallel with a longitudinal axis of the light-emitting filament. It is noted, however, that the light-emitting filament does not have to be straight, but may be curved.

The first and second points may be points where the first and second contacts are in direct electrical contact with the tracks. In such case, the first and second contacts are in touching contact with the tracks at the first and second points. Alternatively, the first and second points may be points where the first and second contacts are in indirect electrical contact with the tracks. In such case, one or more electrically conductive components may for example be arranged between the tracks and the first and second contacts, allowing electricity to flow from the tracks to the first and second contacts, and vice versa.

The present invention is based on the realization that a robust lighting device which generates sufficient luminosity for a wide variety of applications can be manufactured, in a cost-effective and technically simple manner, by mounting light-emitting filaments based on solid-state lighting technology on a circuit board. In particular, the present invention facilitates arranging many light-emitting filaments close together in order to achieve a total luminous output that is sufficiently high for many applications where light-emitting filaments have not previously not been used. Moreover, the light-emitting filaments can be arranged such that the lighting device emits homogeneously distributed light from what appears to be a surface according to an observer, making it particularly suitable for linear lighting applications, such as tubular LED lamps, or TLEDs.

The number of light-emitting filaments depends on, for instance, how much lumen output the application at hand requires and the size of the lighting device. Increasing the number of light-emitting filaments typically increases the total lumen output of the lighting device. The number of light-emitting filaments may for example be at least five, at least ten, at least twelve, at least fifteen, or at least twenty. The number of light-emitting filaments per meter may for example be at least twelve, at least fifteen, or at least twenty.

The first and second tracks may be parallel. In such case, the tangents at the first and second points are also parallel.

An angle formed between the axis of each light-emitting filament and the tangents may be less than 45 degrees, alternatively less than 35 degrees, less than 25 degrees, less than 15 degrees, or less than 10 degrees. The size of the angle may be adapted to the application at hand and also depends on factors such as the length of the light-emitting filaments and the distance between the tracks. In linear lighting applications, it is typically preferable that the angle be as small as possible.

Two adjacent filaments may be arranged so as not to overlap and such that a separation distance is less than a length times the cosine of the angle, wherein the separation distance is a distance along a longitudinal extension of the circuit board between the first contact of one of the filaments and the second contact of the other filament, and wherein the length is the length of the filaments.

The light-emitting filaments may be arranged so that the axes are substantially parallel. Thereby, the light-emitting filaments can be arranged particularly close together along the circuit board, something which may result in a more homogeneous light distribution. By "substantially parallel" is here meant the axes are arranged at an angle of 15 degrees or less with respect to each other.

The circuit board may be planar.

Two consecutive light-emitting filaments may be arranged so as to overlap when viewed in a direction which is parallel with the circuit board and perpendicular to the first and second tracks and so as to not overlap when viewed in a direction which is perpendicular to the circuit board. By positioning the light-emitting filament in such an overlapping arrangement, they can be arranged particularly close together. This helps to increase the brightness of the lighting device. The amount of the overlap depends on factors such as how close together the light-emitting filaments should be arranged and the ratio between the length of the light-emitting filaments and the distance between the tracks on the carrier. Typically, the larger the overlap, the closer together the light-emitting filaments are arranged.

The two consecutive light-emitting filaments may have equal length and overlap by a distance which is at least 10 percent of the ratio of the length to a perpendicular distance between the tracks, alternatively at least 30 percent, at least 50 percent, or at least 70 percent.

The carrier of each light-emitting filament may have a first major surface with solid-state light sources mounted thereon and a second major surface without solid-state light sources mounted thereon. If the carrier has a thin planar shape, for example, the first and second major surfaces are the surfaces that are parallel with the plane of the carrier.

Each light-emitting filament may be arranged such that the first major surface faces away from the circuit board, and the second major surface faces the circuit board.

The carrier of each light-emitting filament may be translucent, and the encapsulant of each light-emitting filament may be arranged on both the first and the second major surfaces of the corresponding carrier. By having a translucent carrier, the carrier will not block light emitted by the solid-state light sources. It is particularly suitable to use such a carrier when the circuit board is provided with a reflective surface. The carrier may for example be transparent.

When the encapsulant is partly arranged on the second side, the lighting device is typically configured such that encapsulant is not in touching contact with the circuit board. This can be achieved in several ways. For example, the tracks of each light-emitting filament may have a thickness such that a gap is formed between the circuit board and the encapsulant arranged on the second major surface. As another example, the electrical contacts of each light-emitting filament may be configured such that a gap is formed between the circuit board and the encapsulant on the second major surface. The first and second electrical contacts may for example have a certain thickness or a certain shape, such that the encapsulant is not in touching contact with the circuit board. As yet another example, each light-emitting filament may be curved away from the circuit board such that a gap is formed between the circuit board and the encapsulant on the second major surface.

The lighting device may further comprise a reflective surface arranged on the circuit board so as to face the light-emitting filaments. The reflective surface may for example be formed by one of a reflector arranged on the circuit board and a reflective layer arranged on the circuit board. The reflective surface may for example be specular reflective, and thereby help to direct the light. The reflective surface may for example be diffuse reflective, and thereby help to spread the light in many directions.

The lighting device may further comprise two side reflectors, and the light-emitting filaments may be arranged between the two side reflectors. The side reflectors may help to direct the light emitted by the light-emitting filament.

The lighting device may comprise a housing which has a light-transmissive portion and inside which the light-emitting filaments and the circuit board are arranged. It may be noted that the lighting device is particularly suitable for linear lighting applications, such as TLEDs.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
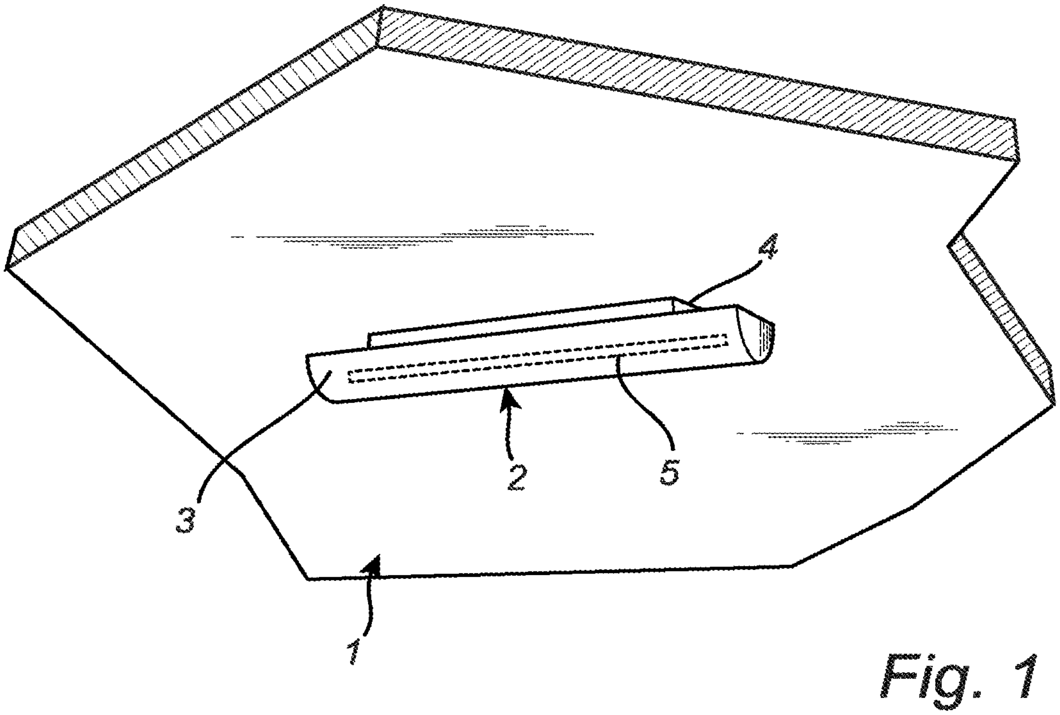
FIG. 1 schematically shows a perspective view of a luminaire.

FIG. 1 shows an example of a luminaire 1. The luminaire 1 illustrated in FIG. 1 is a ceiling-mounted lamp, more specifically an LED batten. The luminaire 1 may be of a different type in a different example and may be intended for outdoor illumination instead of indoor illumination. The luminaire 1 here comprises a cover 2, which includes a light exit window 3, and a connection 4 which is electrically connected to the mains electricity supply. In this case, the connection 4 also allows the luminaire 1 to be mechanically connected to the ceiling. The luminaire 1 further comprises a lighting device 5. The lighting device 5 is here arranged inside the cover 2 and connected to receive electrical power via the connection 4. The lighting device 5 is in this case a TLED, but may be of a different type in a different example, such as an LED module or an LED strip.

Figure 2:
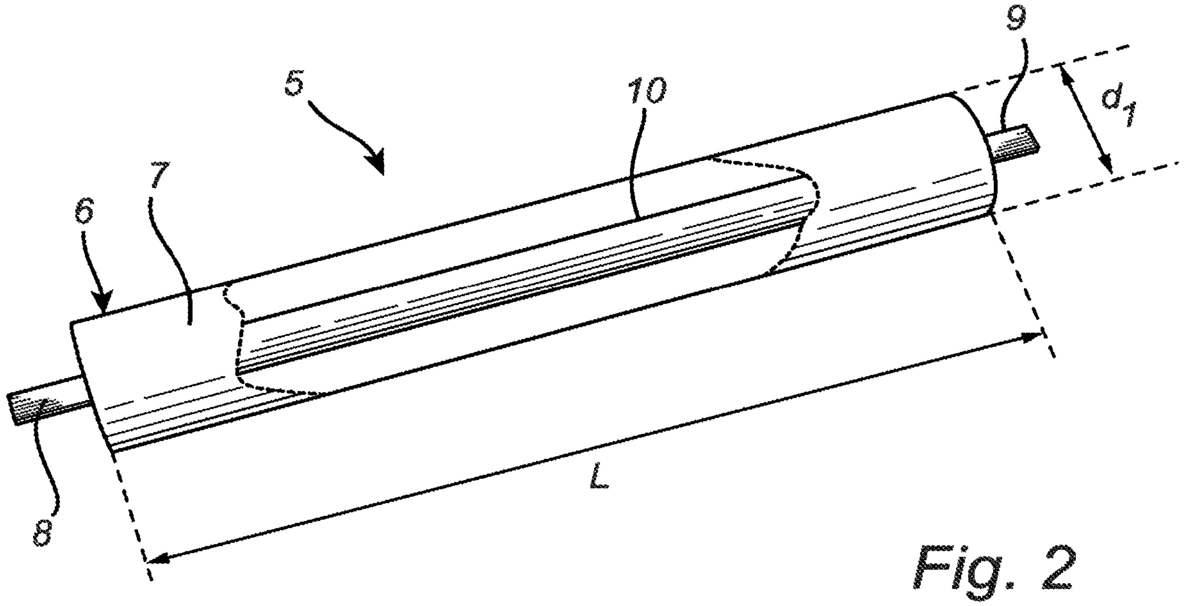
FIG. 2 schematically shows a perspective view of a lighting device according to an embodiment of the present invention. A part of the lighting device has been broken away to show the interior.
Figure 3:
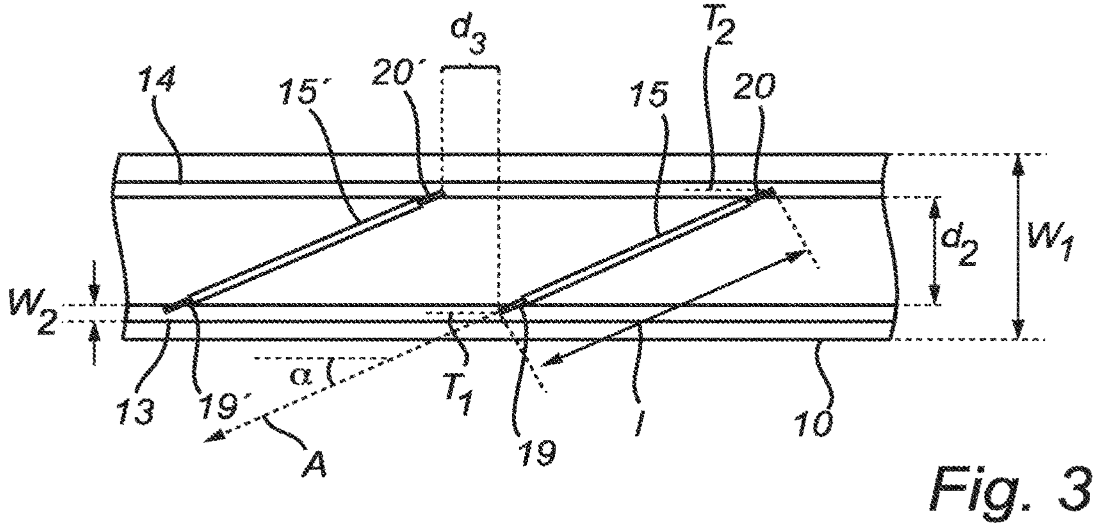
FIG. 3 schematically shows a top view of a part of the lighting device in FIG. 2.
Figure 4:
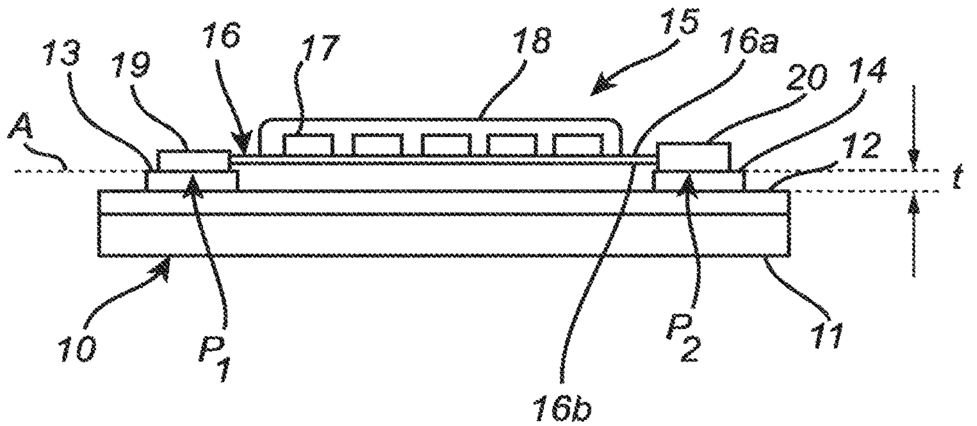
FIG. 4 schematically shows, from an angled side view, a part of the lighting device in FIG. 2.

FIGS. 2 to 4 show the lighting device 5 in more detail. The lighting device 5 includes in this case a tubular housing 6. The shape of the housing 6 is that of a straight tube having a circular transverse cross section, but the housing 6 may have a different shape and/or transverse cross section in a different example, such as a U-shaped cross section. The length L of the housing 6 is in this case approximately 1 meter, although the length may be longer or shorter in a different example. The diameter $d_1$ of the housing 6 is in this case a couple of centimeters. The housing 6 can for example be made of a plastic material or glass. The housing 6 comprises a light-transmissive portion 7 through which light emitted by the lighting device 5 can pass. The light-transmissive portion 7 may be adapted to diffuse light, so as to increase the homogeneity of the distribution of the light from the lighting device 5. Two connectors 8, 9 are in this case attached at the longitudinal ends of the housing 6. The connectors 8, 9 are configured to mechanically mount the lighting device 5 inside the luminaire 1 and to receive electrical power from the connection 4.

The lighting device 5 further comprises a circuit board 10. In this case, the circuit board 10 is a printed circuit board. The circuit board 10 is elongated. Specifically, the circuit board 10 is in this case straight and planar. The longitudinal extension of the circuit board 10 is here parallel to the length of the housing 6. The circuit board 10 is in this case almost as long as the housing 6, i.e. approximately 1 meter. In many applications, the length of the circuit board 10 is in the range from 0.1 m to 2 m, such as from 0.2 m to 1.5 m, or 0.3 m to 1.2 m. The width $w_1$ of the circuit board 10 is here slightly less than the diameter $d_1$ of the housing 6. In many applications, the width $w_1$ of the circuit board 10 may be in the range from 0.5 cm to 10 cm, such as from 1 cm to 5 cm, 1.5 cm to 4 cm, or 2 cm to 3 cm. The ratio of the length of the circuit board 10 divided by the width $w_1$ of the circuit board 10 may for example be at least 5, such as at least 10, at least 15, at least 20, or at least 30.

The circuit board 10 is in this case of a conventional type known in the art and comprises a base layer 11 and an electrically insulating layer 12 arranged on the base layer 11. Further, the circuit board 10 comprises a first electrically conductive track 13 and a second electrically conductive track 14, henceforth referred to as the first track 13 and the second track 14, or simply the tracks, for brevity. The tracks 13, 14 are here arranged on the electrically insulating layer 12. The first and second tracks 13, 14 follow a first and second path, respectively. The tracks 13, 14 are in this case straight and parallel, but may for example be curved and parallel in a different example. Thus, the first and second paths are in this case straight and parallel. The tracks 13, 14 are arranged at a perpendicular distance $d_2$ from each other. The tracks 13, 14 are typically made of a metal, such as copper. Each track 13, 14 has a width $w_2$ which is smaller than half the width $w_1$ of the circuit board 10. Each track 13, 14 has in this case a thickness t which may for example be in the range from 5 microns to 15 microns, although tracks 13, 14 that are thicker than 15 microns are conceivable. The tracks 13, 14 are connected to receive electrical power, in this case via the connection 4.

The lighting device 5 further comprises several light-emitting filaments 15, 15' arranged on the circuit board 10. The light-emitting filaments 15, 15' will henceforth be referred to as the filaments for brevity. The filaments 15, 15' are arranged consecutively along the tracks 13, 14, and each filament 15, 15' extend between the tracks 13, 14. The filaments 15, 15' are in this case parallel, so their associated axes A (further discussed below) are also parallel. All of the filaments 15, 15' of the lighting device 5 are in this case of the same type, but this is not necessarily the case in a different example. The number of filaments 15, 15' depends on application-specific requirements but is in many applications at least five. The filament 15, 15' are elongated and, in this case, straight. The length l of the filaments varies depending on the application, but is typically is in the range from 2 cm to 12 cm, such as 3 cm to 10 cm, or 4 cm to 8 cm.

One of the filaments 15, 15' of the lighting device 5 will now be described in greater detail with reference to the filament denoted by the reference numeral 15 and FIG. 4. Since all of the filaments 15, 15' are of the same type in this case, the following description applies all of the filaments of the lighting device 5.

As can be seen in FIG. 4, the filament 15 comprises an elongated carrier 16, which may alternatively be referred to as a substrate. Specifically, the carrier is in this case planar and straight. The carrier 16 has a first major surface **16*a* facing the circuit board 10 and a second major surface 16*b* which faces away from the circuit board 10. The carrier 16 is here parallel with the circuit board 10. Specifically, the first and second major surfaces 16*a*, 16*b* are parallel with the plane of the circuit board 10. Some examples of materials which the carrier 16 can be made of include polymers, glass and quartz. The carrier 16 is in this case rigid, but may be flexible in a different example. The carrier 16** comprises electrical circuitry (not shown), such as printed electrically conductive tracks.

The filament 15 further comprises several solid-state light sources 17 mounted on the carrier 16. The solid-state light sources 17 will henceforth referred to as the “light sources” for brevity. In this case, the light sources 17 form a single, straight row along the carrier 16, although the light sources may be arranged in some other manner in a different example, such as in a zigzag pattern. The light sources 17 are in this case arranged on the first major surface **16*a* of the carrier 16 but not on the second major surface 16*b* of the carrier 16. The light sources 17 may be arranged on both the first and second major surfaces 16*a*, 16*b* of the carrier 16 in a different example. The light sources 17 are oriented so as to emit light in a main direction of illumination which is directed perpendicularly away from the circuit board 10. The number of light sources 17 may for example be at least ten, such as at least fifteen, at least twenty, at least thirty, or at least thirty-five. For purposes of greater clarity, however, only five light sources 17 are illustrated in FIG. 4. The light sources 17 are in this example light-emitting diodes (LEDs), so the light sources 17 are configured to emit LED light and the filament 15 may be referred to as an LED filament. The light sources 17 may for example be semiconductor LEDs, organic LEDs or polymer LEDs. The light sources 17 may be for example be phosphor converted LEDs, RGB LEDs, blue LEDs, and/or UV LEDs. All of the light sources 17 are in this case configured to emit light of the same color, although in other examples different light sources 17** may be configured to emit light of different colors.

The filament 15 further comprises an encapsulant 18. The encapsulant 18 helps, for example, to improve light outcoupling. The encapsulant 18 at least partly encloses the light sources 17 so that light emitted by the light sources 17 passes through the encapsulant 18. It is noted that, in a different example, the encapsulant 18 may enclose only some of the light sources 17. In this case, the encapsulant 18 also covers a part of the carrier 16, more specifically the first major surface 16*a*. There is in this case no encapsulant 18 arranged on the second major surface 16*b* where there are no light sources 18. However, in a different example, the encapsulant 18 may be arranged on both the first and second major surfaces 16*a*, 16*b* of the carrier 16.

The encapsulant 18 comprises a translucent material. The translucent material may for example be a polymer, such as a silicone material. The ability of silicone to withstand heat and light exposure makes it suitable to be used as encapsulant. In this case, the encapsulant also comprises an optional wavelength-converting material. The wavelength-converting material may be a luminescent material, such as an inorganic phosphor, an organic phosphor, quantum dots and/or quantum rods. The phosphor may be a blue, yellow/green, and/or red phosphor. A blue phosphor may be used to convert UV light into blue light, a green/yellow phosphor may be used to convert UV and/or blue light into green/yellow light, and a red phosphor may be used to convert UV, green/yellow, and/or blue light into red light.

The wavelength-converting material is here configured to at least partly convert light emitted by the light sources 17 to converted light. The converted light has a different wavelength than the light emitted by the light sources 17. The converted light may for example have a longer wavelength than the unconverted light. The unconverted light may for example be blue and/or violet, and the converted light may for example be green, yellow, orange and/or red.

Hence, the light emitted by the filament 15 comprises in this case a mix of light converted by the wavelength-converting material and non-converted light emitted by the light sources 17. Stated differently, the filament 15 is here configured to emit LED filament light which is a mix of LED light and converted LED light. The ratio between the converted light and the non-converted light depends on how much of the light emitted by the light sources 17 that is converted by the wavelength-converting material. In some applications, the wavelength-converting material and the color of the light emitted by the light sources 17 are chosen such that the filament 15 emits white light. The white light may for example be light which is within 16 SDCM from the black body locus. The color temperature of such white light may for example be in the range from 2000 K to 6000 K, alternatively in the range from 2300 K to 5000 K or in the range from 2500 K to 4000 K. The color rendering index CRI of such white light may for example be at least 70, alternatively at least 80 or at least 85, such as 90 or 92.

It is noted that the encapsulant 18 may in a different example comprise a light scattering material in addition to or instead of the wavelength-converting material. Examples of suitable light-scattering materials include: $BaSO_4$, $TiO_2$, $Al_2O_3$, silicone particles and silicone bubbles.

The filament 15 further comprises a first electrical contact 19 and a second electrical contact 20. The first and second electrical contacts 19, 20 will henceforth referred to as the first and second contacts, or simply the contacts, for brevity. The contacts 19, 20 are attached to the carrier 16. Specifically, in this case, the first contact 19 is attached to one of the two longitudinal ends of the carrier 16, and the second contact 20 is attached to the other longitudinal end of the carrier 16. The contacts 19, 20 are electrically connected to the light sources 17, here via the electrical circuitry on the carrier 16. Further, the contacts 19, 20 are here directly attached to, and hence in touching contact with, the tracks 13, 14. Thus, the contacts 19, 20 are here in direct electrical contact with the tracks 13, 14. Soldering may for example be used to attach the contacts 19, 20 to the tracks 13, 14. As is best seen in FIG. 3, the first contact 19 of the filament 15 and the second contact 20' of the next filament 15' are in this case separated from each other by a separation distance $d_3$ along the longitudinal extension of the circuit board 10. The value of the separation distance $d_3$ vary depending on the application. For example, the two adjacent filaments 15, 15' may be arranged so as such that $d_3 < l \times \cos(\alpha)$, where l denotes the length of the filaments 15, 15' and a denotes the angle which the axis A makes with the tangents $T_1$, $T_2$ (further discussed below).

The point where the first contact 19 is attached to and electrically connected to the first track 13 is denoted by $P_1$ in FIG. 4, and will henceforth be referred to as the first point $P_1$. Similarly, the point where the second contact 20 is attached to and electrically connected to the second track 14 is denoted by $P_2$ in FIG. 4, and will henceforth be referred to as the second point $P_2$. The first and second points $P_1$, $P_2$ are arranged on an axis A and at a distance from each other. The axis A is non-perpendicular to a tangent $T_1$ to the first path, i.e. the path followed by the first track 13, at the first point $P_1$ and to a tangent $T_2$ to the second path, i.e. the path followed by the second track 14, at the second point $P_2$. The tangents $T_1$, $T_2$ are in this case parallel since the first and second paths are parallel.

The angle which the axis A makes with the tangents $T_1$, $T_2$ is denoted by a in FIG. 3. The angle $\alpha$ is in this case approximately 45 degrees, but may have a different value in a different example. In general, the value of the angle $\alpha$ is typically somewhere in the range from 10 degrees to 45 degrees, but may be greater than 45 degrees or smaller than 10 degrees in some applications. The angle $\alpha$ is typically at least 1 degree, such as at least 3 degrees or at least 5 degrees.

Figure 5:
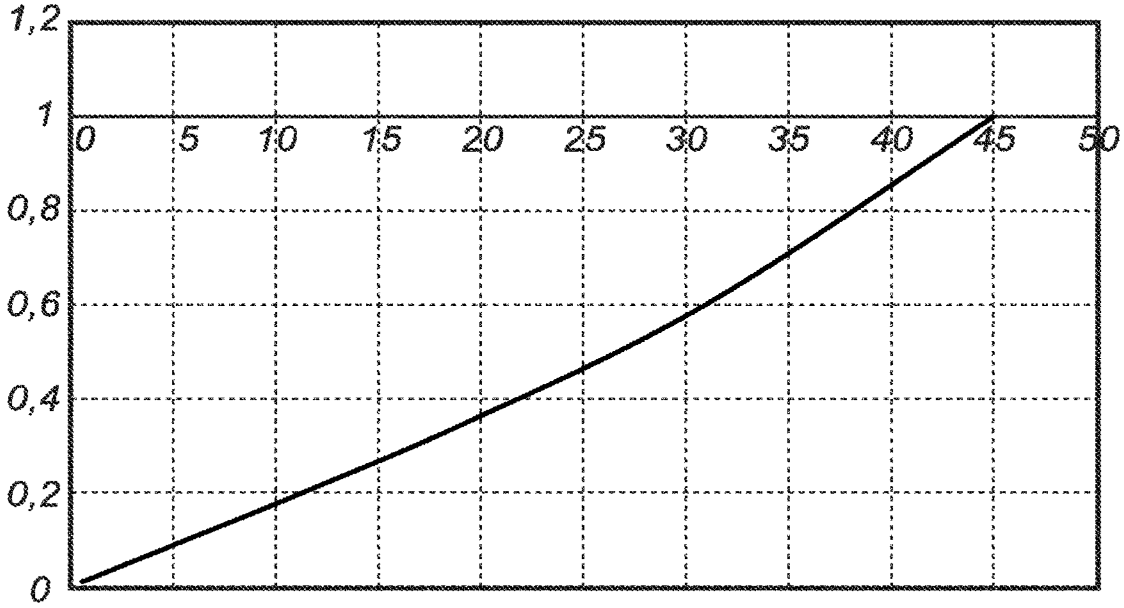
FIGS. 5 and 6 are diagrams.
Figure 6:
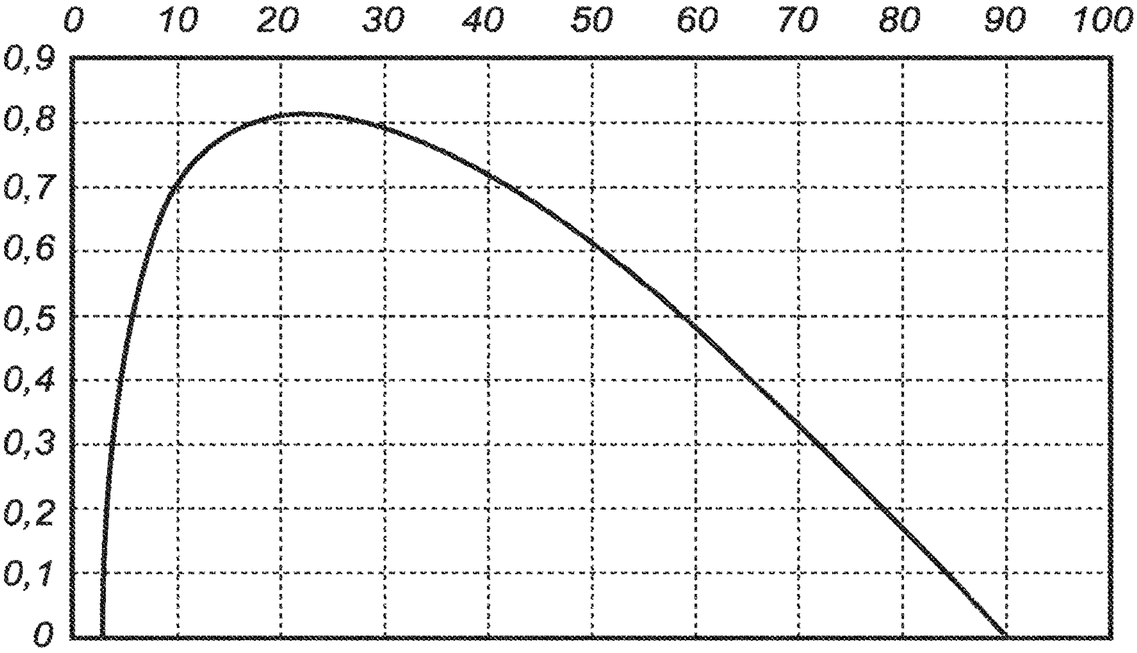

FIG. 5 shows the angle $\alpha$ minimum with respect to the aspect ratio of a filament, i.e. the thickness divided by the length. In FIG. 5, the horizontal axis shows the angle $\alpha$ minimum measured in degrees, and the vertical axis shows the aspect ratio. FIG. 6 shows the overlap fraction for a filament with an aspect ratio of 0.05, such as a filament having a thickness and length of 3 mm and 60 mm, respectively. In FIG. 6, the horizontal axis shows the angle $\alpha$ measured in degrees, and the vertical axis shows the overlap fraction.

During operation, the lighting device 5 receives electrical power from the mains via the connection 4. The filaments 15, 15' emit light which is transmitted through the housing 6 and the light exit window 3 of the cover 2 to illuminate the surroundings of the luminaire 1.

Figure 7:
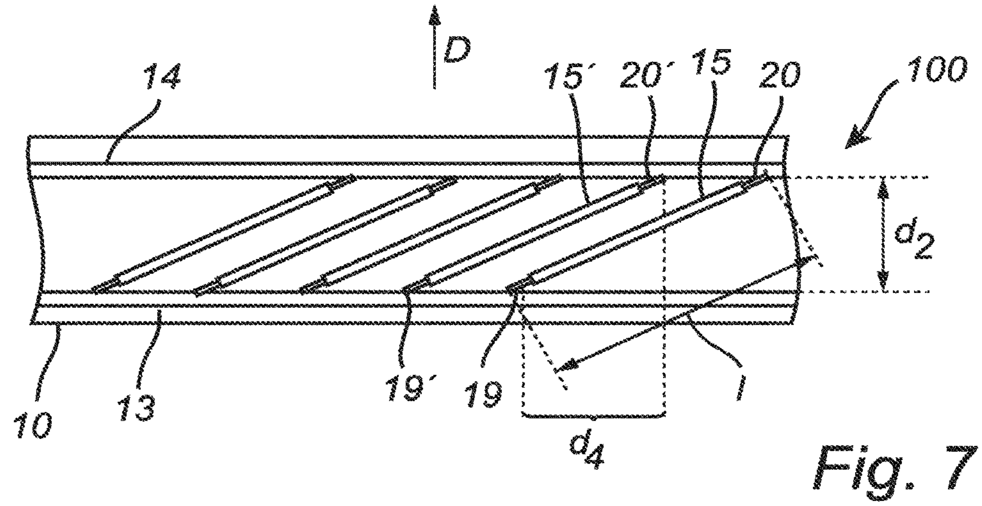
FIGS. 7 and 8 schematically show top views of parts of lighting devices according to different embodiments of the present invention.

FIG. 7 shows a lighting device 100 which is similar to the lighting device 5 discussed above with reference to FIGS. 1 to 4, except in that the filaments 15, 15' are arranged in an overlapping manner. That is to say, each pair of two consecutive filaments 15, 15' overlap when viewed in a direction D which is parallel with the circuit board 10 and also perpendicular to the first and second tracks 13, 14. The pairs of consecutive filaments do in this case not overlap when viewed in a direction which is perpendicular to the circuit board 10, i.e. the direction into the paper in FIG. 7. Two consecutive light-emitting filaments 15, 15' overlap by a distance $d_4$ along the longitudinal extension of the circuit board 10. The distance $d_4$ depends on application-specific requirements. Typically, the distance $d_4$ is somewhere in the range from 10% to 70% of the ratio of the length l of the filaments 15, 15' divided by the distance $d_2$ between the tracks 13, 14. It is noted that the larger the overlap $d_4$, the larger the minimum value of the angle $\alpha$ shown in FIG. 3.

Figure 8:
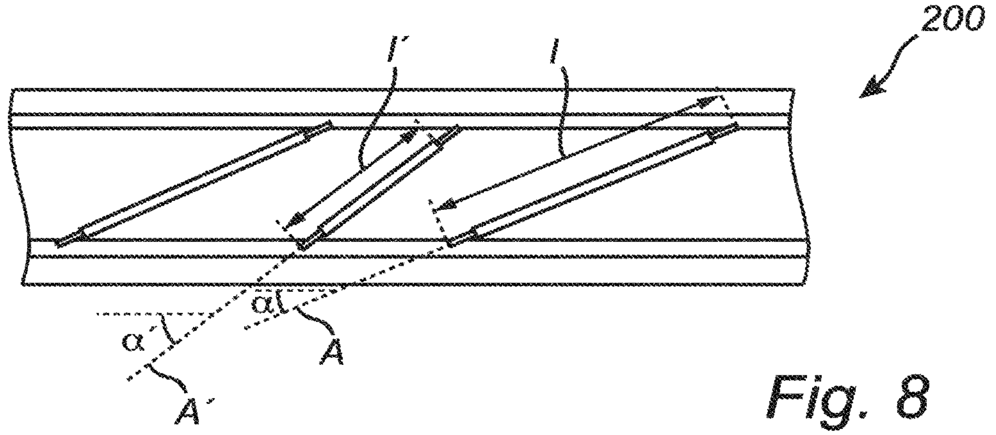

FIG. 8 shows a lighting device 200 which is similar to the lighting device 5 discussed above with reference to FIGS. 1 to 4, except in that the all of the filaments do not have the same length. The filaments having different lengths l, l' are in this case not parallel, and their associated axes A, A' are also not parallel. Consequently, the filaments having different lengths l, l' form different angles α, α' with the tangents to the paths followed by the tracks 13, 14.

Figure 9:
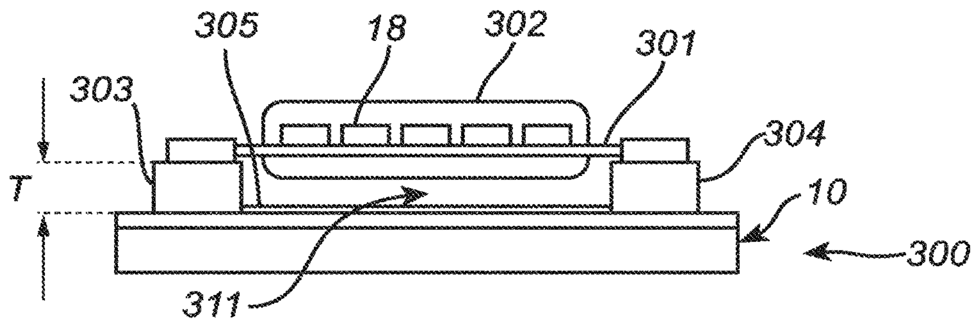
FIGS. 9 to 16 schematically show, from angled side views, parts of lighting devices according to different embodiments of the present invention.

FIG. 9 shows a lighting device 300 which is similar to the lighting device 5 discussed above with reference to FIGS. 1 to 4, except for a few differences. The carrier 301 of the lighting device 300 is translucent. The encapsulant 302 is arranged on both sides of the carrier 301. That is to say, the encapsulant 302 is here arranged on both the first major surface of the carrier 301 and the second major surface of the carrier 301. The luminescent material may be arranged in the part of the encapsulant 302 which is arranged on the first major surface and/or in the part of the encapsulant which is arranged on the second major surface. The light sources 18 are mounted on the first major surface, and there are no light sources 18 on the second major surface. The tracks 303, 304 have an increased thickness T compared to the tracks 13, 14 of the lighting device 5 discussed above with reference to FIGS. 1 to 4. The increased thickness T is such that the encapsulant 302 such that a gap 311 is formed between the circuit board 10 and the encapsulant 302. Stated differently, the encapsulant 302 is not in touching contact with the circuit board 10. Typically, the increased thickness T is in the range from 0.1 mm to 6 mm, such as 0.5 mm to 4 mm, or 1 mm to 3 mm.

Further, the lighting device 300 comprises in this case a reflective surface 305 arranged on the side of the circuit board 10 which faces the filaments. The reflective surface 305 is in this case formed by a layer made of a material that reflects light, such as a layer based on aluminum or silver. The reflective surface 305 may be formed by a specular reflective layer. The reflective surface 305 may be formed by a light-diffusing layer, for example a layer including a polymer matrix, such as silicone, with light-scattering particles. The reflectance of the reflective surface 305 may for example be greater than 80 percent, such as greater than 85 percent, greater than 90 percent, or greater than 92 percent. The reflectance of the reflective surface 305 may for example be 92 percent or 94 percent.

When the lighting device 300 in FIG. 9 is in use, some of the light emitted by the light sources 18 is scattered by the encapsulant 302, passes through the transparent carrier 301, and strikes the reflective surface 305 which reflects the light.

Figure 10:
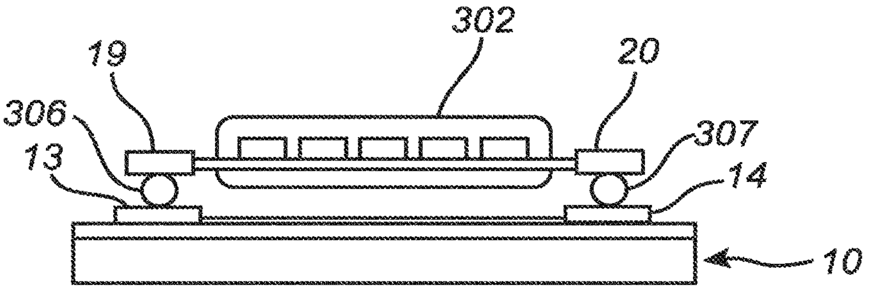
Figure 11:
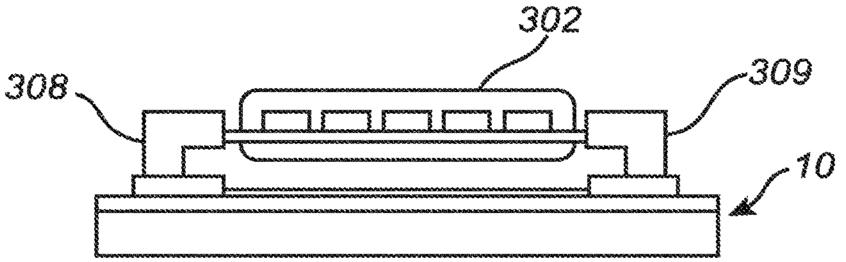
Figure 12:
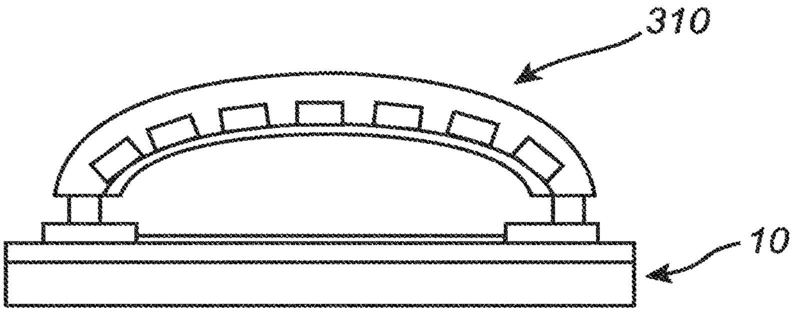

FIGS. 8 to 10 illustrates examples of other ways of ensuring that a gap is formed between the encapsulant 302 and the circuit board 10, so these components are not in touching contact. FIG. 10 illustrates the use of electrodes 306, 307, such as electrically conductive wires, arranged between the tracks 13, 14 and the contacts 19, 20. The contacts 19, 20 are thus indirectly attached to, and in indirect electrical contact with, the tracks 13, 14 in this case. FIG. 11 illustrates the use of contacts 308, 309 that are shaped such that there is a gap between the encapsulant 302 and the circuit board 10. The contacts 308, 309 here has a V-shape, but may have a different shape in a different example, such as a U-shape. FIG. 12 illustrates the use of a curved filament 310. The curved filament 310 is arranged so as to be curved away from the circuit board 10.

Figure 13:
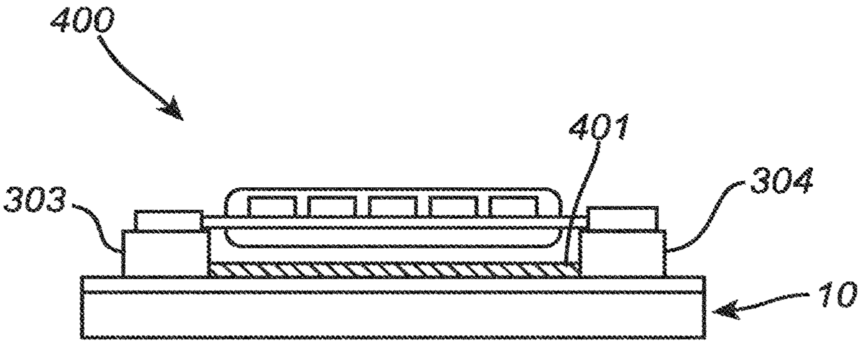
Figure 14:
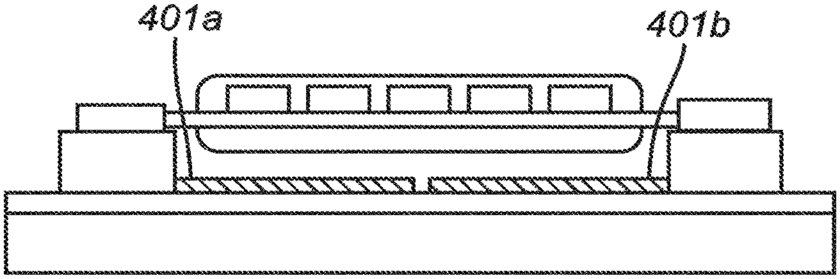

FIG. 13 shows a lighting device 400 which is similar to the lighting device 300 discussed above with reference to FIG. 9, except in that the reflective surface 401 of the lighting device 400 is formed by a reflector which is arranged on the circuit board 10 between the tracks 304, 305. As illustrated in FIG. 14, the reflector may comprise several separate segments 401*a*, 401*b*. Such a reflector helps to reduce the risk of short circuits and other reliability issues.

Figure 15:
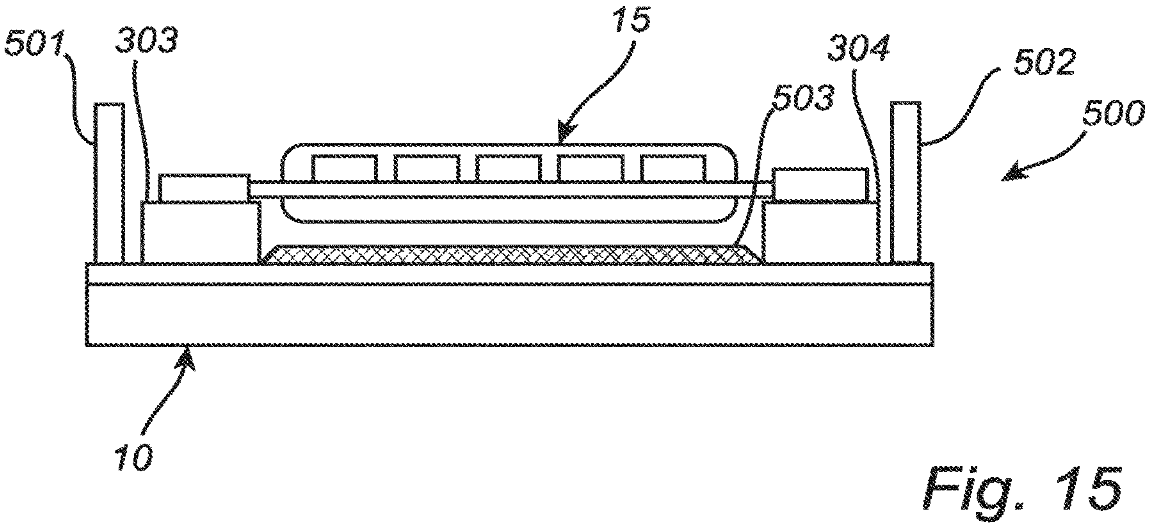
Figure 16:
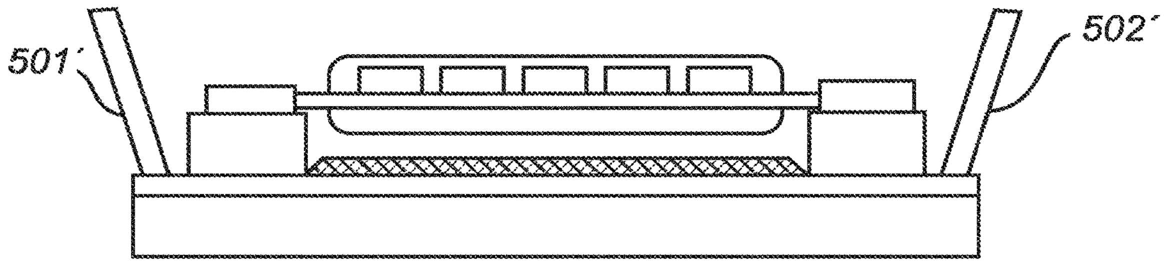

FIG. 15 shows a lighting device 500 which is similar to the lighting device 300 discussed above with reference to FIG. 9, except for a few differences. The lighting device 500 does not include the reflective surface/layer 305 shown in FIG. 9. The lighting device 500 comprises two side reflectors 501, 502 and an optical element 503. The optical element 503 is arranged on the circuit board 10 between the tracks 303, 304. The optical element 503 may for example be configured to refract light or reflect light. The side reflectors 501, 502 are arranged on the circuit board 10, so that the filaments 15 are arranged between the side reflectors 501, 502. The side reflectors 501, 502 here extend along circuit board 10, i.e. into the paper in FIG. 15. The side reflectors 501, 502 extend straight up from the circuit board 10 as illustrated in FIG. 15, but may be arranged differently in a different example. For example, the side reflectors may be inclined away from each other, as illustrated in FIG. 16, showing inclined side reflectors 501', 502'.

It is noted that although the lighting devices illustrated in FIGS. 13 and 14 are provided with both side reflectors and an optical element, other embodiments of the present invention may include only side reflectors but no optical element, or vice versa.

Figure 17:
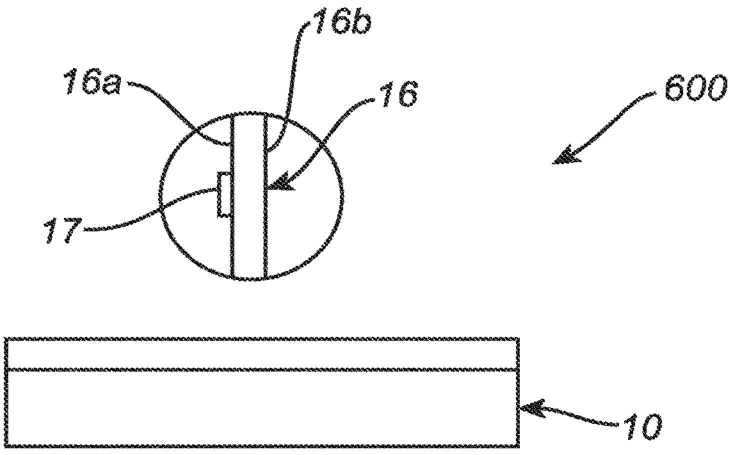
FIG. 17 schematically shows a cross-sectional view of a part of a lighting device according to an embodiment of the present invention.

FIG. 17 shows a lighting device 600 which is similar to the lighting device 300 discussed above with reference to FIG. 9, except in that each filament is arranged so that the carrier 16 is perpendicular to the circuit board 10. Specifically, the first and second major surfaces 16*a*, 16*b* are perpendicular to the plane of the circuit board 10. Thereby, the light sources 17 are oriented so as to emit light in a main direction of illumination which is parallel to the circuit board 10.

The person skilled in the art realizes that the present invention by no means is limited to the preferred embodiments described above. On the contrary, many modifications and variations are possible within the scope of the appended claims. For example, some filaments may be arranged in an overlapping manner and others not. As another example, the circuit board may be replaced by two rigid electrically conducting wires which extend in parallel and across which the filaments are arranged in parallel electrically.

Additionally, variations to the disclosed embodiments can be understood and effected by the skilled person in practicing the claimed invention, from a study of the drawings, the disclosure, and the appended claims. In the claims, the word “comprising” does not exclude other elements or steps, and the indefinite article “a” or “an” does not exclude a plurality. The mere fact that certain measures are recited in mutually different dependent claims does not indicate that a combination of these measured cannot be used to advantage.

The invention claimed is:

1. A lighting device comprising:

a plurality of light-emitting filaments, wherein each light-emitting filament comprises:

a carrier, two electrical contacts attached to the carrier, a plurality of solid-state light sources mounted on the carrier and electrically connected to the first and second electrical contacts, and an encapsulant comprising a translucent material, wherein the encapsulant at least partially encloses the solid-state light sources so as to receive light emitted by the solid-state light sources;

two rigid electrically conducting wires which extend in parallel and across which the filaments are arranged in parallel electrically, wherein the light-emitting filaments are arranged consecutively along the two rigid electrically conducting wires and extend therebetween, wherein one of the electrical contacts of each light-emitting filament is electrically connected to one of the rigid electrically conducting wires at a first point on said one of the rigid electrically conducting wires and the other electrical contact of each light-emitting filament is electrically connected to the other one of the rigid electrically conducting wires at a second point on said other one of the rigid electrically conducting wires, and wherein the first and second points associated with each light-emitting filament are arranged at a distance from each other on an axis, and wherein the axis of each light-emitting filament is non-perpendicular to a tangent to said one of the rigid electrically conducting wires at the first point and to a tangent to said other one of the rigid electrically conducting wires, at the second point.

2. The lighting device according to claim 1, wherein the first and second tracks are parallel.

3. The lighting device according to claim 2, wherein an angle formed between the axis of each light-emitting filament and the tangents is less than 45 degrees, alternatively less than 35 degrees, less than 25 degrees, less than 15 degrees, or less than 10 degrees.

4. The lighting device according to claim 3, wherein two adjacent filaments are arranged so as not to overlap and such that a separation distance is less than a length times the cosine of said angle, wherein the separation distance is a distance along a longitudinal extension of the circuit board between the first contact of one of the filaments and the second contact of the other filament, and wherein said length is the length of the filaments.

5. The lighting device according to claim 1, wherein the light-emitting filaments are arranged so that the axes are substantially parallel.

6. The lighting device according to claim 1, wherein the circuit board is planar.

7. The lighting device according to claim 6, wherein two consecutive light-emitting filaments are arranged so as to overlap when viewed in a direction, which is parallel with the circuit board and perpendicular to the first and second tracks and so as to not overlap when viewed in a direction which is perpendicular to the circuit board.

8. The lighting device according to claim 7, wherein the two consecutive light-emitting filaments have equal length and overlap by a distance which is at least 10 percent of the ratio of said length to a perpendicular distance between the tracks, alternatively at least 30 percent, at least 50 percent, or at least 70 percent.

9. The lighting device according to claim 1, wherein the carrier of each light-emitting filament has a first major surface with solid-state light sources mounted thereon and a second major surface without solid-state light sources mounted thereon.

10. The lighting device according to claim 9, wherein each light-emitting filament is arranged such that the first major surface faces away from the circuit board, and the second major surface faces the circuit board.

11. The lighting device according to claim 10, wherein the tracks of each light-emitting filament have a thickness such that a gap is formed between the circuit board and the encapsulant arranged on the second major surface.

12. The lighting device according to claim 10, wherein the electrical contacts of each light-emitting filament are configured such that a gap is formed between the circuit board and the encapsulant on the second major surface.

13. The lighting device according to claim 9, wherein the carrier of each light-emitting filament is translucent, and wherein the encapsulant of each light-emitting filament is arranged on both the first and the second major surfaces of the corresponding carrier.

14. The lighting device according to claim 1, further comprising a reflective surface arranged on the circuit board so as to face the light-emitting filaments.

15. The lighting device according to claim 1, further comprising two side reflectors, wherein the light-emitting filaments are arranged between the two side reflectors.

* * * * *